United States Patent [19]

Schraeder et al.

[11] Patent Number: 4,669,489
[45] Date of Patent: Jun. 2, 1987

[54] STRAW CHOPPER MOUNTING FOR A COMBINE

[75] Inventors: John A. Schraeder, Silvis; William M. Boehler; Philip C. Kester, both of East Moline, all of Ill.

[73] Assignee: Deere & Company, Moline, Ill.

[21] Appl. No.: 803,370

[22] Filed: Dec. 2, 1985

[51] Int. Cl.⁴ .............................................. A01F 12/40
[52] U.S. Cl. ................................. 130/27 R; 241/186.3
[58] Field of Search ........................... 130/27 R, 27 T; 241/186.3, 186.4

[56] References Cited

U.S. PATENT DOCUMENTS

| | | | |
|---|---|---|---|
| 2,213,906 | 9/1940 | Ebersol | 130/27 |
| 2,862,536 | 12/1958 | Gronberg | 241/243 |
| 3,587,690 | 6/1971 | Peak | 241/186.4 |
| 3,712,309 | 1/1973 | Schmitz | 130/27 T |
| 4,383,536 | 5/1983 | Delorme | 130/27 R |
| 4,484,587 | 11/1984 | Rhineri | 130/27 R |
| 4,526,180 | 7/1985 | Scott et al. | 130/27 R |
| 4,617,942 | 10/1986 | Garner | 130/27 R |

OTHER PUBLICATIONS

Massey-Ferguson Sales Literature page (publication date before Apr. 2, 1985).
John Deere Werke Zweibrucken Operator's Manual, OM-Z91497, Issue C2 for Combines 1065 etc., pp. 92, 93 only.

Primary Examiner—Paul J. Hirsch

[57] ABSTRACT

The rear mounted straw chopper of a combine harvester receives the straw discharge from the straw walkers of the combine and discharges chopped straw rearwardly. The chopper is slidably supported on a pair of spaced apart, longitudinally oriented guide rails so that the chopper can be adjusted from a rearward, operating position to a forward, inoperative or windrow position in which straw bypasses the chopper. Movement of the chopper on its guide rails is facilitated by attachment to the straw chopper casing of a transverse shaft and sprocket assembly, the teeth of a pair of sprockets engaging longitudinally spaced openings in the guide rails so that, upon rotation of the shaft, the sprockets and guide rails cooperate in rack and pinion fashion to propel the chopper assembly along the rails while maintaining it in square alignment. The shaft and sprocket assembly may be rotated conveniently by means of a wrench engaging flats on an end of the shaft.

9 Claims, 4 Drawing Figures

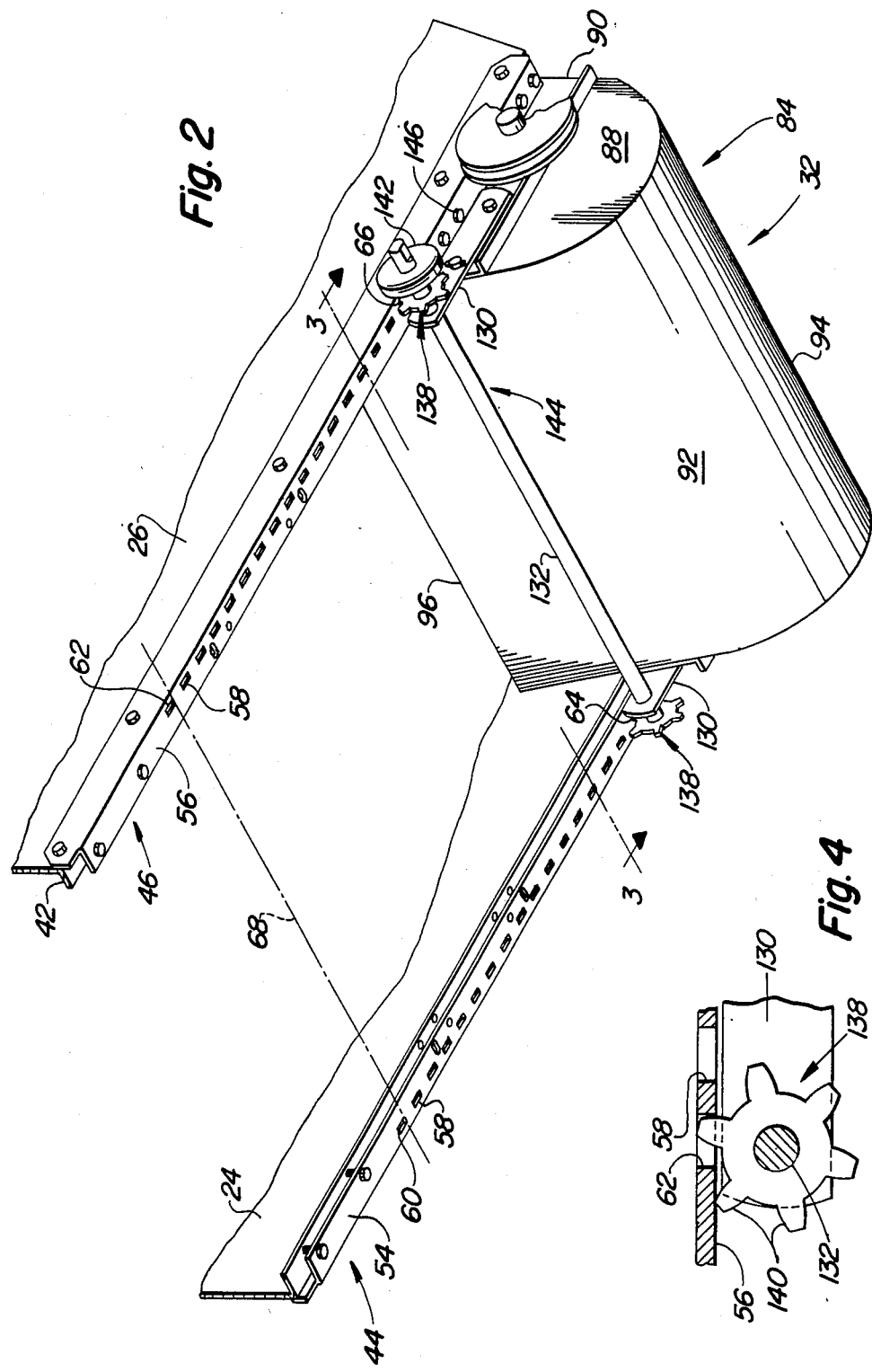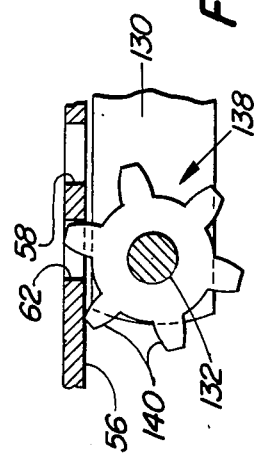

STRAW CHOPPER MOUNTING FOR A COMBINE

BACKGROUND OF THE INVENTION

This invention concerns a mounting arrangement for a supplementary crop processing device for a harvester and more particularly, a mounting for a bulky, heavy device which is movable selectively between operating and non-operating positions, such as a straw chopper on a combine harvester.

In a typical combine harvester, either so-called conventional or rotary, straw from the separator is discharged downwardly from the hood structure at the rear of the combine. This straw is already somewhat reduced from the threshing and separating operations and, if it is desired to reduce it further, it is passed through a straw chopper.

The most common type of straw chopper consists of a transversely mounted flail rotor associated with a transverse array of fixed shear blades carried in a housing with an upwardly directed inlet opening and supported beneath the combine hood to intercept the flow of straw from the separator. In some harvesting conditions, or to preserve longer straw for some later use, it is desirable to return the straw to the ground without passing it through the straw chopper.

Two principal methods are known for removing the chopper from the path of the straw. U.S. Pat. No. 3,712,309 (Schmitz) discloses a chopper supported on a pair of approximately horizontal rails, one on each side of the combine hood. The straw chopper may be releasably secured in either a rearward operating position or in a forward transport (or inoperative position) in which the straw chopper is removed from the path of the straw flow from the separator. In a second method, embodied, for example, in the German-made John Deere combines model numbers 1065 and 1075, the straw chopper is supported on a linkage permitting it to be pivotably swung from a rearwardly operating position to a forward transport position. In a third approach, Scott (U.S. Pat. No. 4,526,180) inactivates the straw chopper for discharging the straw into a windrow by opening a door in the floor of the chopper casing, allowing the straw to be discharged before reaching the straw chopping rotor. The straw chopper unit, as a whole, remains fixed in relation to the combine hood.

These known methods of inactivating the straw chopper each have their disadvantages and limitations. In the simple slide arrangement of Schmitz, even if the slide could be maintained horizontal (which, with reference to the overall combine design, is generally not convenient), moving the chopper is difficult. Manually moving the chopper or man-handling it along the slides is made difficult by a combination of high frictional forces between the chopper and mating slide members and, if the chopper is not kept perfectly square with the combine, binding or jamming occurs. Given the widths of many modern combines and hence, the relatively large lateral spacing between the support rails of the chopper and the length of the chopper structure engagement with the rails, it is often difficult even for two men to move one of the larger choppers. Introduction of anti-friction devices (rollers or the like) at the sliding surfaces have been proposed, but these would not necessarily overcome the binding or cocking problem, would add to the cost of the chopper, and in some conditions, increase the hazards to the operator in moving the chopper by making it difficult to control on a slope, etc. (unless very sophisticated anti-friction devices were used, giving support and guidance in both horizontal and vertical planes).

The John Deere swinging linkage arrangement potentially costs more to manufacture than a simple slide (as in Schmitz) even if only a simple linkage is used. Use of a simple linkage limits the range of chopper position and attitude in the transport position. The swinging chopper approach requires relatively more sophisticated fastener or latching arrangements for securing the chopper in its two positions, contributing significantly to the potential increase in manufacturing costs compared with the simple slide arrangement.

The apparently simple convertibility of Scott is appealing, requiring only the raising or lowering of the lower front side portion or pan of the casing (58) allowing straw to be dumped straight through the straw chopper casing (15) and onto the ground without being chopped. However, the advantage of maintaining the straw chopper rotor in a fixed position relative to the straw discharge from the combine separator must require some tradeoff in terms of cost of sheet metal deflectors, space consumption, and optimization of feeding the chopper rotor if the rotor is to be effective both in and out of the flow material from the combine separator.

SUMMARY OF THE INVENTION

Accordingly, it is an object of the invention to provide a combine harvester straw chopper mounting which is simple in structure and relatively low in manufacturing cost and which permits one man with moderate effort and improved safety to adjust the chopper fore-and-aft.

In accordance with the invention, a supplementary crop material processing device, such as a straw chopper, is supported on a pair of parallel, spaced-apart rails, which are required to provide only the vertical support for the chopper. Preferably, lateral positional stability and directional control of the straw chopper is maintained or achieved by rotatable drive means engageable between the chopper and the harvester structure and operative, on being rotated, to displace the chopper fore-and-aft on the rails, including moving the chopper between extreme positions of adjustment-operating and inoperative positions, respectively.

In a preferred embodiment of the invention, the drive means comprises a rack and pinion arrangement with the pinion associated with the movable straw chopper and the rack parallel to, or preferably forming part of, the guide rail structure of the harvester. A pinion assembly may comprise a transverse shaft substantially spanning the width of the straw chopper and carrying at each of its opposite ends, a pinion member in the form of an extended pitch sprocket with teeth spaced apart so as to be engageable with a matching series of "notches" (which may be openings, such as slots or holes, for example) in the harvester guide rail structure. The pinion shaft may be shaped in at least one location to be engageable by a tool, such as a wrench, for manually rotating the shaft. Preferably, the pinion sprockets are timed together and fixed non-rotatably to the shaft and, in manufacture and assembly, it is arranged that the corresponding notches forming the rack in the rail structure are in transverse alignment so that once the straw chopper assembly, including the teeth of the pinion sprockets, have been squarely engaged with the supporting guide rails of the harvesting structure, rotation of the pinion shaft will move the opposite sides of the straw chopper structure in unison so that it may be conveniently displaced in either direction along the rails, between opposite extreme positions corresponding to straw chopper operation and straw chopper disengagement.

It is a feature of the invention that the timing together of the twin pinion sprockets and the lateral alignment of the notches of the parallel "racks" formed by the guide rails, automatically maintain directional control of the chopper assembly and keep it square with the guide rails as it is being advanced or retracted along the guide rails. Alignment is maintained whether the straw chopper is moved by means of the drive mechanism (torque applied to the pinion assembly) or whether the chopper assembly is manually displaced along the guide rails. An additional feature of the automatic alignment is that if the ends of the rack portions of the spaced apart parallel guide rails are also in alignment, effective stops are provided at both ends and serve to precisely position the straw chopper in its operating position and in its inactive position, thus facilitating securing the chopper in those respective positions, for example, by the insertion of clamping hardware.

BRIEF DESCRIPTION OF THE DRAWINGS

FIG. 2 is an enlarged underside left front perspective showing the straw chopper and its support rails with the chopper in a rearward, operating position.

FIG. 4 is an enlarged partial view, taken on line 4—4 of FIG. 3, with the chopper in its forward position, illustrating the "stop" function of the rack and sprocket.

DESCRIPTION OF THE PREFERRED EMBODIMENT

Figure 1:
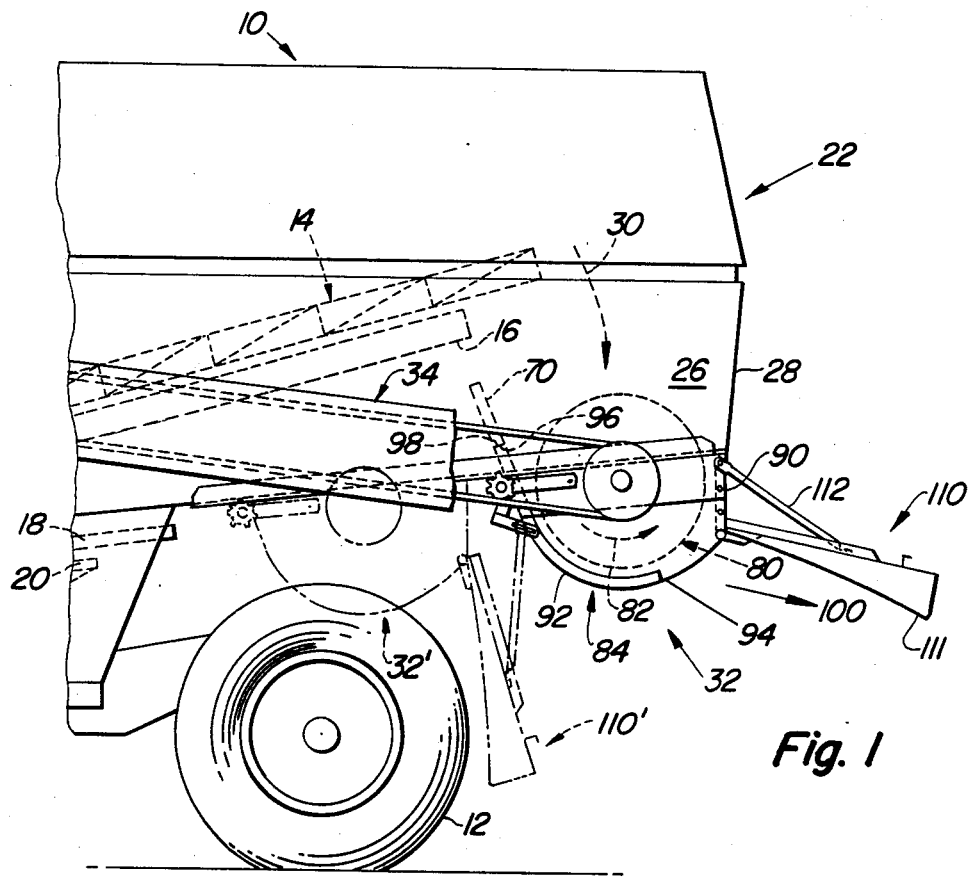
FIG. 1 is a somewhat schematic left-hand side elevation of the rear portion of a self-propelled combine harvester embodying the invention.

The invention is embodied in an otherwise generally conventional self-propelled combine harvester, only the rear portion of which is shown in FIG. 1. The combine body 10 is carried by wheels, including a pair of steerable rear wheels 12 and includes straw walkers 14, a return conveyor 16 beneath the walkers, and a longitudinally reciprocating cleaning shoe including an upper screen or chaffer 18 and a lower screen or sieve 20. The rearward portion of the combine body 10 comprises a hood 22 forming an open bottomed chamber defined by opposite right- and left-hand side walls 24, 26, respectively, and a rear wall 28 providing a cover and protection for some of the combine components, including the straw walkers 14 and containing and directing the flow of straw from the straw walkers downwards, as indicated by arrow 30. A straw chopper assembly 32, generally conventional in terms of overall function and configuration, is carried by and beneath the hood 22 and is powered through a belt drive 34 extending along the left-hand side of the combine body 10. Looking at the combine hood 22 in more detail and referring particularly to FIGS. 2 and 3, the opposite lower edges of the hood side walls 24, 26 lie in a common generally horizontal plane and each side wall is turned inward to form a flange 40, 42, respectively. A pair of rails, right- and left-hand, 44 and 46, respectively, are attached to the respective hood side walls by suitable fasteners 48 and each rail is spaced downward from its side wall flange (40, 42), so as to create a pair of longitudinally extending guide spaces 50, 52. The horizontal flanges 54, 56 of the guide rails each have a series of uniformly spaced rectangular slots 58. In assembly, the foremost pair of slots 60, 62 and the rearmost pair of slots 64, 66 are in transverse alignment, as indicated in the case of the forward slots by the line 68 in FIG. 2. A baffle plate 70, disposed low and somewhat forward of the rear or discharge end of the straw walkers 14, transversely spans the hood 22 and is attached rigidly at its opposite ends to the hood side walls 24, 26.

The chopper assembly 32 need be described only briefly here. Its transverse rotor 80, powered by the belt drive assembly 34 and driven in the direction indicated by arrow 82, is at least partially contained in a casing 84 consisting of opposite end or side walls, right- and left-hand 86 and 88, respectively, and an upright rear wall 90. Partially wrapping the rotor 80 and forming a guide surface for crop material processing by the chopper assembly, is a wrapper or deflector wall 92 ending at a rearward transverse discharge edge 94 and extending upwards partially into the hood chamber to end in a transverse inlet or upper edge 96 which registers with the lower edge 98 of the fixed transverse baffle 70. Thus, with the straw chopper assembly 32 in the rearward, operating position shown in FIG. 1, the rearward or inner surfaces of the inner baffle 70 and the wrapper 92 form a continuous deflecting or guiding surface, directing discharge of straw from the chopper in the general direction indicated by arrow 100.

A vaned straw spreader assembly 110 is supported and extends rearwardly from the rear wall 90 of the straw chopper and is positioned so as to intercept the straw discharge from the chopper, directing it somewhat downwardly and, by virtue of its diverging vanes 111, spreading it over a width greater than that of the combine. The spreader assembly 110 is pivotably attached to the chopper rear wall 90 and braced by adjustable members 112 so that the angle of the spreader assembly 110, relative to the horizontal, can be changed.

The upper edges of the chopper side walls 86, 88 are bent outwards to form a pair of generally horizontal flanges 114, 116 and these flanges are reinforced by support angles 118, 120, attached to the chopper side walls and flanges by spot welding or other suitable means. For supporting the chopper assembly 32 on the hood 22, the double flanges thus formed along the upper edges of the chopper walls are entered into the spaces or channels 50, 52 so that the chopper assembly may be supported by the flanges 54, 56 of the hood guide rails 44, 46 and locked in position by suitable clamping hardware such as the nut and bolt assemblies 122 shown in the drawings.

In each side of the straw chopper assembly 32, adjacent the side wall flanges 114, 116, a pinion assembly support strap 130 is attached by suitable hardware and extends somewhat forward of the straw chopper wrapper 92. A pinion shaft 132 spans the combine hood 22 passing through holes 134 and the support straps 130. The left-hand end of the shaft 132 extends somewhat beyond the hood left-hand side wall 26 and drive surfaces, such as the parallel flats 136 (seen best in FIG. 3), are formed on its free end. A pair of "pinions" 138 are rigidly attached to the shaft 132 at a spacing equal to that of the transverse center spacing of the rows of slots 58 in the guide rails 44, 46. These pinions 138 are in the form of extended pitch sprockets with teeth 140 at relatively wide pitch centers matching the pitch center distance of the arrays of slots 58 in the guide rails 44, 46. The pinions 138 are timed together and the support straps 130 are positioned so that in assembly, the teeth 140 may enter the slots 58 in the guide rails 44, 46 as shown best in FIG. 3. As well as providing the possibility for driving the chopper assembly along its guide rails, the engagement of the pinions 138 with the slots 58 positions the shaft 132 laterally. A safety shield 142 in the form of a flanged disc is rigidly attached to the shaft 132 just outboard of the sprocket 138 on the left-hand side of the hood 22. The shaft 132, with attached sprockets 138 and shield 142 and with the support straps 132 loose on the shaft between the sprockets, comprise a sprocket sub-assembly 144.

In assembly of the straw chopper to the combine, the chopper assembly 32, less the sprocket sub-assembly 144, is positioned and supported by the rails 44 and 46 and moved forward so that when the sprocket sub-assembly 144 is attached to the chopper assembly, by means of attaching the support straps 130 to the side walls 86, 88 of the chopper with appropriate hardware, the opposite sprockets 138, laterally aligned, engage opposite slots 58 in the guide rails 44, 46.

Figure 3:
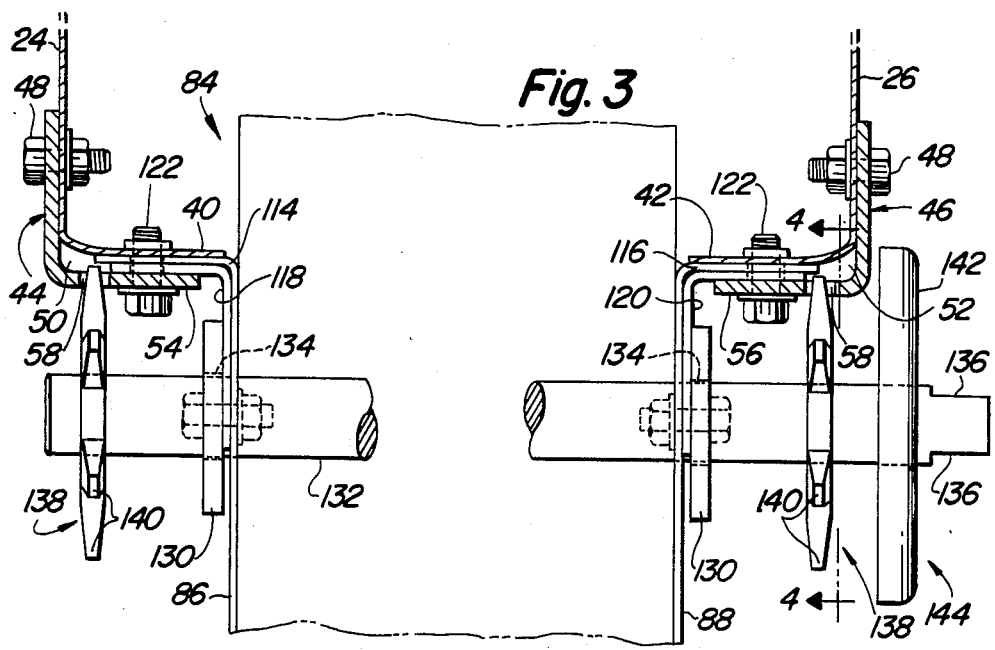
FIG. 3 is a further enlarged cross-sectional view approximately on line 3—3 of FIG. 2 showing the mechanism for slidably adjusting the straw chopper on its support rails.

In operation, the chopper assembly 32 is driven to the desired position, either fully rearward in an operating and chopping position as indicated in full line in FIG. 1, or fully forward to a windrowing or disengaged position, as indicated in phantom outline at 32' in FIG. 1. Provision of the flats 136 on the shaft 132 enables the shaft 132 to be rotated conveniently using a standard wrench on the flats 136 and hence, propelling the chopper assembly with the notches or slots 58 of the guide rails and the sprockets 138 functioning as a rack and pinion. Any initial misalignment of the chopper is corrected automatically when the shaft 132 is "torqued" and both sprockets 138 are brought into driving engagement with their respective slots 58. In both positions, the chopper assembly 32 is secured by hardware 122 as shown in FIG. 3.

The length of the arrays of slots 58 in the guide rails 44, 46 is sufficient only to provide drivable movement between the precise operating and disengaged or windrow positions. The corresponding, laterally aligned front and rear pairs of slots (60, 62 and 64, 66) are disposed so that, in either direction, engagement of a sprocket tooth 140 with the underside of a guide rail flange 54 or 56 (as shown in FIG. 4) "stops" the chopper assembly, squarely aligned and with holes in the guide rails substantially aligned for easy insertion of the securing hardware 122. Final maneuvering of the chopper assembly, if required for better hole alignment, is easily done by one person from one side of the combine using a wrench on the flats 136 of the shaft 132. Once the chopper assembly 32 has been properly assembled and aligned and the sprocket sub-assembly 144 is in position with sprockets 138 engaging the slots 58 of the guide rail, the rigid torsional connection between the pair of sprockets 138 provided by their attachment to the shaft 132 provides positive alignment for the chopper whether movement is by wrench on the shaft flats 136, or by sliding it manually on the rails. This latter operation may sometimes be convenient in cases where the chopper is freely movable on the guide rails and, for example, the guide rails slope slightly downward as they do in a forward direction in the present embodiment (as shown in FIG. 1). Sliding may be accomplished with no risk of binding through skewing of the chopper because of the positive aligning effect of the rigid sprocket sub-assembly 144, engaging the slots 58 of the parallel racks 44, 46.

The present invention greatly facilitates the adjustment and handling of a straw chopper supported and slidably movable on guide rails. An operator can simply drive the chopper from one position to another with very much reduced effort while the means of adjustment automatically maintains the alignment of the chopper. Application of the invention to a conventional chopper already carried on guide rails is accomplished cheaply and simply. Addition of the slots (58) to the guide rail (44, 46) makes the rail a dual purpose member-rack as well as supporting guide rail. The straw chopper assembly itself (32) need be modified only by adding mounting holes for the sprocket sub-assembly (144). Addition of the compact sprocket sub-assembly does not significantly increase the bulk of the straw chopper assembly.

In the present embodiment, the straw spreader deflector assembly 110 is carried entirely by the chopper assembly 32. In the operating position of the straw chopper (fully rearward position), the spreader assembly 110 is supported approximately horizontally, its angle being adjustable through the provision of a range of attachment holes for the braces 112. In the forward inoperative or windrow position (32'), the spreader assembly 110 is adjusted downwards, as indicated in phantom outline at 110' in FIG. 1, to allow unobstructed flow of straw from the straw walkers, directly downwards onto the ground for formation of a windrow.

We claim:

1. In a combine harvester having a body and adapted to advance over a field to gather and process a grain crop including a straw fraction which, after processing, is discharged generally downwards from the body at a straw discharge, the body including, adjacent the straw discharge, a pair of parallel, spaced apart guide members extending generally horizontally and the harvester including a straw chopper slidably supported by the guide members for movement towards and away from the straw discharge between a chopping position, in which straw is received at the straw discharge and discharged as chopped straw, and a windrow position, in which straw bypasses the chopper, characterized in that:

the straw chopper includes a drive means, said drive means having at least one rotatable element engageable with at least one of the guide members and operable upon rotation of the rotatable element to drive the chopper along the guide members.

2. The combine harvester of claim 1 wherein the rotatable element comprises a transverse unitary element drivably engaging both of the guide members in a fixed relationship so that as the chopper is driven along the guide members, a predetermined alignment of the chopper with respect to the guide members is maintained.

3. The combine harvester of claim 1 wherein the rotatable element comprises a shaft and sprocket assembly including a pair of spaced apart, rotationally timed sprockets rigidly attached to the shaft and the guide members each include an array of recesses together comprising a pair of arrays, laterally aligned and parallel to one another so that in assembly, with the chopper in transverse alignment, the respective sprockets engage the respective recess arrays and rotation of the shaft propels the straw chopper along the guide members in response to the engagement of the sprockets with the recess arrays and maintaining the transverse alignment.

4. The combine harvester of claim 1 wherein the rotatable element includes a sprocket having a plurality of teeth and one of the guide members includes a first rack and wherein, in assembly, the sprocket teeth and rack are in functional engagement so that rotation of the sprocket propels the chopper along the guide members.

5. The combine harvester of claim 4 wherein the rotatable element further includes a second sprocket having a plurality of teeth and a second rack on the other of the guide members, said second sprocket teeth and said second rack being in functional engagement and said first and second racks being parallel and in lateral alignment and said sprockets being timed together so that rotation of the sprockets propels the chopper along the guide members while maintaining a predetermined alignment of the chopper with respect to the guide members.

6. The combine harvester of claim 5 wherein the first and second racks each have first and second ends and undersides and the respective ends are in lateral alignment and wherein the drive means includes means for arresting movement of the chopper at a predetermined position.

7. The combine harvester of claim 6 wherein the means for arresting movement comprises engagement of a sprocket tooth with a guide member underside adjacent a first end of a rack.

8. The combine harvester of claim 1 wherein the chopper carries a deflector for controlling the direction of chopped straw discharged by the chopper and wherein said deflector is entirely supported by the chopper assembly.

9. The combine harvester of claim 1 wherein the rotatable element includes means for non-rotatably receiving a wrench whereby the rotatable element may be manually actuated.

* * * * *